(12) United States Patent
van der Horn (10) Patent No.: US 6,713,893 B2
(45) Date of Patent: Mar. 30, 2004

(54) EFFICIENT WIND GENERATOR

(76) Inventor: Tiemen J. van der Horn, 47 Cockburn Street, Box 764, Richmond, Ontario (CA), K0A 2Z0

( * ) Notice: Subject to any disclaimer, the term of this patent is extended or adjusted under 35 U.S.C. 154(b) by 0 days.

(21) Appl. No.: 10/108,461

(22) Filed: Mar. 29, 2002

(65) Prior Publication Data

US 2002/0140235 A1 Oct. 3, 2002

(30) Foreign Application Priority Data

Mar. 30, 2001 (CA) .............................................. 2342375

(51) Int. Cl.$^7$ ................................................. F03D 9/00
(52) U.S. Cl. .......................................... 290/55; 290/44
(58) Field of Search ...................... 290/44, 55; 310/115; 415/1; 476/38

(56) References Cited

U.S. PATENT DOCUMENTS

| | | | |
|---|---|---|---|
| 1,533,467 A | 4/1925 | Sargent | |
| 2,153,523 A | 4/1939 | Roberts | |
| 4,039,848 A * | 8/1977 | Winderl | 290/55 |
| 4,045,144 A * | 8/1977 | Loth | 415/1 |
| 4,285,481 A | 8/1981 | Biscomb | |
| 4,291,234 A * | 9/1981 | Clark | 290/53 |
| 4,625,160 A * | 11/1986 | Hucker | 322/32 |
| 4,710,100 A | 12/1987 | Laing et al. | |
| 5,065,638 A | 11/1991 | Barens | |
| 5,089,734 A * | 2/1992 | Bickraj | 310/83 |
| 5,098,993 A * | 3/1992 | Kawanami et al. | 528/499 |
| 5,241,232 A * | 8/1993 | Reed | 310/178 |
| 5,506,453 A | 4/1996 | McCombs | |
| 5,663,600 A * | 9/1997 | Baek et al. | 290/55 |
| 5,873,800 A * | 2/1999 | Maslow et al. | 476/38 |
| 5,876,181 A * | 3/1999 | Shin | 415/2.1 |
| 6,119,539 A * | 9/2000 | Papanicolaou | 74/112 |
| 6,254,034 B1 | 7/2001 | Carpenter | |
| 6,304,017 B1 * | 10/2001 | Leupold | 310/115 |

* cited by examiner

Primary Examiner—Joseph Waks
(74) Attorney, Agent, or Firm—Freedman & Associates (57) ABSTRACT

A wind generator includes a first rotor disposed with a first axis of rotation for converting wind energy into rotational energy and a second rotor disposed with a second axis of rotation different from the first axis of rotation. With sufficient wind, the first rotor provides power to a first field rotor of a generator and the second rotor provides power to a second field rotor of the generator. When the field rotors rotate relative to each other electrical energy is generated.

6 Claims, 7 Drawing Sheets

Fig. 4　Top view

EFFICIENT WIND GENERATOR

This application claims priority from Canadian Patent Application No. 2,342,375 filed Mar. 30, 2001.

FIELD OF THE INVENTION

This invention relates to the production of electric power generated from the wind. More specifically, the invention relates to the production of electrical power from wind with relatively low wind speed and at relatively low cost.

BACKGROUND OF THE INVENTION

Wind turbines represent a safe and clean source of power. One of the main problems with generating power from the wind is that it is often difficult to extract significant amounts of power from wind. Additionally, even in areas of relatively high wind it is often the case that using wind power to generate electricity is not cost effective.

In a conventional windmill used for generating electricity it is common to have a large propeller mounted on a tall tower in an area known to have high winds. This limits the use of electrical power generation from wind due to the availability of suitable areas with high winds. When a windmill with this design is used in an area with lower wind speed it often does not produce an adequate amount of electrical power. When this style of windmill is used in lower wind conditions the propeller's rotational speed is often inadequate or insufficient torque is available for direct input to a large generator, so the use of a high ratio transmission is necessary to increase the input to the generator. Since the single wind turbine is very large it rotates slowly such that the outside edge of the turbine is not rotating too fast. If the outside edge of the turbine is moving too fast then the turbine will be subjected to significant mechanical stress which may lead to failure. In order to prevent excessive stress on the wind turbine, most designs for wind turbines feature some sort of braking system to prevent damage associated with high wind conditions. For example in U.S. Pat. No. 1,533,467, filed Jun. 16, 1921, Sargent uses a spring mechanism to vary the angle of the blades of the propeller. In a very high wind the blades are turned into the wind to reduce their rotational velocity.

Additionally, the single large diameter turbine produces very high torque at relatively low speed. The high torque at low speed must be converted to a lower torque at a higher speed to produce usable power from a conventional generator. Since the torque load is high, a gear system used to couple the single turbine to a generator will be prone to high cost and wear.

Additionally, high loads lead to situations in which rotor blades stall prematurely when insufficient wind is available. To marginally increase generator output using a single wind turbine, the turbine size must increase disproportionately. Increased size in a rotor blade will cause problems with weight, strength of building materials, and vibration. Consequently a substantial amount of energy is lost due to friction, or drag.

In U.S. Pat. No. 2,153,523, filed Mar. 25, 1937, Roberts et al. describe a wind generating turbine in which the generator is driven by two sets of propeller blades. The first set of blades drive an armature. The second set of blades drive the field coils that rotate in the opposite direction to the first set of blades. This prior art does not incorporate any gears between the propeller rotors and the electrical generator. Additionally, the two rotating elements are not mechanically linked. Since the second propeller is located behind the first there is less energy available to it. Consequently, Roberts et al. recommend that the second propeller be larger than that the first so that both propellers extract a similar amount of energy.

It is well known in the art that the high speeds necessary to generate usable electricity from normal wind energy require that the components in the generator rotate much faster than the propeller rotors. Consequently, the design presented by Roberts will not produce power efficiently. Additionally, since this design has no gears it likely has very little friction however it is unlikely that normal winds are strong enough to produce significant amounts of power from this configuration.

In U.S. Pat. No. 4,710,100, filed May 17, 1987, Liang et al. describe the advantages of using relatively small diameter propellers that work in groups to generate electricity instead of using a single larger propeller. Liang correctly points out that the cost of larger turbines is very high in comparison with the cost of a set of smaller turbines capable of covering the swept area. Liang further demonstrates that the gyroscopic torque, blade vibration, inertia and weight are all substantially improved by using a few small turbines for a given swept area instead of one large one. Additionally, a pair of propellers can be arranged such that the gyroscopic torques are equal an opposite. Also, the cost of gears for stepping up the rotational speed of the output shaft is much lower due to the lower torque requirements. These effects all result in a much lighter system. It follows that the tower used to mount this system is also much lighter, simpler and less expensive. Consequently, the tower is also much less expensive. Liang suggests mechanically linking the propellers together, resulting in them all having the same rotational speed. The mechanical output of the combined system is then used to pressurize a flow of water that is used to drive a generator for producing electricity.

In U.S. Pat. No. 5,506,453, filed Dec. 18, 1991, McCombs describes a wind turbine system with a first turbine on one end of a pod and a second turbine on the opposite end of a pod. McCombs takes advantage of gearing to increase the rotational speed of the generator inputs as well as using a generator similar to the generator disclosed by Roberts et al. as explained previously. Unfortunately, disruption of the airflow caused by the first turbine reduces the effectiveness of the second turbine. Due to the design of the generator, it is necessary to either link the two inputs to the generator or care must be taken to ensure that both inputs have roughly equal torque and rotational velocity. Consequently, it is necessary to ensure that both turbines extract the same amount of power from the wind. Unfortunately, disruption of the airflow caused by the first turbine reduces the effectiveness of the second turbine. This may be overcome by increasing the size of the second turbine, using a less efficient first turbine or moving the second turbine so far from the first that the airflow is no longer disrupted. Clearly these solutions will result in either less power output or increased cost.

In a wind farm, a large rotor blade produces large wind shadows, and therefore other nearby wind generators within the wind shadow operate below peak efficiency. Consequently, wind generators must be separated to avoid problems caused by wind shadow.

For the reasons previously stated, today's wind generators are limited to high wind areas such as hilltops and shorelines. Many more areas have wind that is not as fast as the wind required for a conventional wind turbine.

Clearly, it would be advantageous to produce a practical electrical power generating system that effectively uses a wider range of wind speeds as an energy source.

SUMMARY OF THE INVENTION

According to the invention there is provided an electrical generator for converting energy from wind into electrical energy comprising:
- a first rotor for converting wind energy into rotational energy and disposed with a first axis of rotation;
- a second rotor for converting wind energy into rotational energy disposed with a second axis of rotation different from the first axis of rotation; and
- a generator having;
  - a first field rotor in mechanical communication with the first rotor for receiving rotational energy therefrom, and
  - a second field rotor in mechanical communication with the second rotor for receiving rotational energy therefrom;
- wherein in use rotation of the first rotor in response to wind causes rotation of the first field rotor in a first direction and rotation of the second rotor in response to a wind with approximately same direction and energy causes rotation of the second field rotor in a second opposite direction.

Additionally the invention teaches an electrical generator for converting energy from wind into electrical energy comprising:
- a rotor for converting wind energy into rotational energy and disposed with a first axis of rotation;
- a generator having;
  - a first field rotor in mechanical communication with the first rotor for receiving rotational energy therefrom, and
  - a second field rotor in mechanical communication with the first rotor for receiving rotational energy therefrom;
- wherein, in use, rotation of the rotor in response to wind causes rotation of the first field rotor in a first direction and the second field rotor in a second opposite direction.

BRIEF DESCRIPTION OF THE DRAWINGS

Exemplary embodiments of the invention will now be described in conjunction with the drawings, in which.

DETAILED DESCRIPTION OF THE INVENTION

As explained in the prior art, the use of a generator that uses two rotating elements and generates electrical power based upon the difference in their rotational velocity is known. In order to take advantage of this configuration it is necessary to ensure that roughly equivalent amounts of torque and power are available to each of the generator's inputs.

Figure 1:
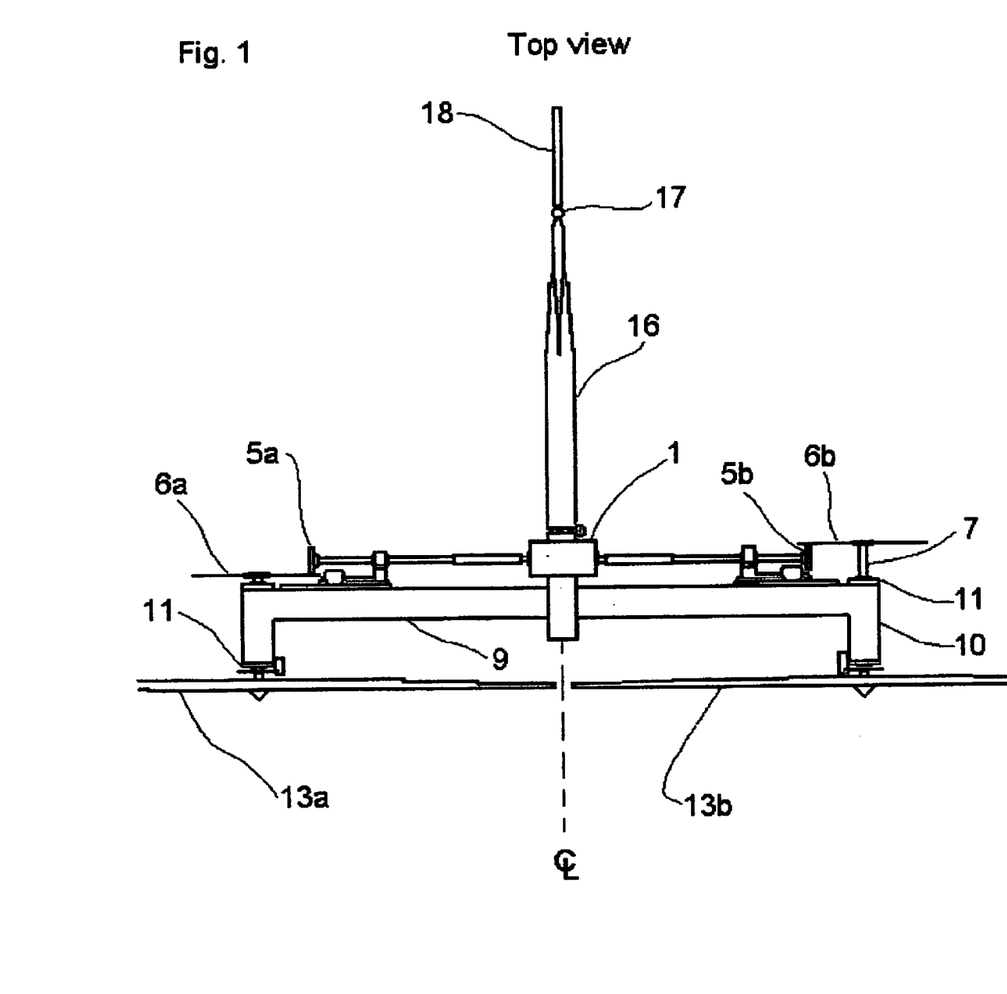
FIG. 1 is a top view of an embodiment of the invention with two wind turbines, each having a variable ratio mechanical linkage with each linkage being mechanically coupled to the generator.

Referring to FIG. 1, a top view of a first embodiment of a wind generator designed according to the invention is presented. This embodiment features two turbines disposed to receive equal wind and therefore each turbine extracts an approximately same amount of energy from the wind.

The rotor blades 13a and 13b are designed to ensure that, in use, they are turning in opposite directions when the wind blows against them. The framework consists of light materials and hollow metal structures that are light yet strong. A horizontal beam 9 made from hollow metal tubing separates the rotor blades 13a and 13b at a distance so they do not interfere with each other. The beam also has two rotor blade supports 10, one welded at each end. These carry the two rotors blades 13a and 13b, shafts 7, and bearings 11 on sides A&B. The contact surfaces of the wheels 5a and 5b which ride on these metal discs 6a and 6b are made of a rubber compound to better grip the metal disc's surfaces. The shafts 7 extend from the rotor blades 13a and 13b to the metal discs 6a and 6b respectively. Splined slip-joints 4 are featured on both sides of the embodiment. The drive shafts 200a and 200b fit into these splines to allow for the travel of wheels 5a and 5b back and forth along the metal discs 6a and 6b. The controls used to move the wheels 5a and 5b on the discs 6a and 6b are mounted on the cross member 9. In this way, rotational mechanical energy is transferred from the rotor blades 13a and 13b to the input shafts of the alternator 1. The alternator housing shields the alternator from the outside environment. This embodiment includes a horizontal support for the tail section 16 and rudder 18, and a rudder pivot point 17.

Figure 2:
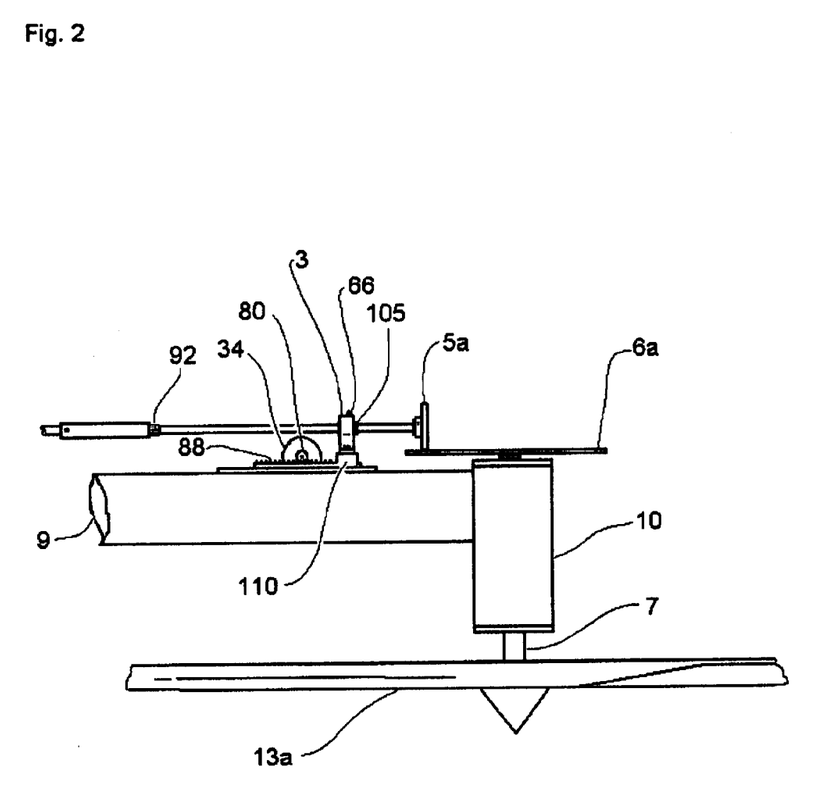
FIG. 2 is a detailed view of a variable ratio transmission for use with an embodiment of the invention using a rack and pinion mechanism.

Referring to FIG. 2, a mechanism for controlling the position of the wheel 5a on the drive disc 6a is shown. This system relies upon an external sensor and controller for each drive shaft that are not shown in the figure. The gear bar 88 engages a gear 80 that is driven by the stepper motor 34. The guide 110 is designed to slide with respect to the cross member 9 in response to mechanical outputs from the stepper motor. The mechanical linkage between the wheel 5a and the guide is designed such that when the guide is 110 is displaced along the cross member 9 the wheel 5a is displaced with respect to disc 6a in a similar manner. When wind or electrical load conditions change the stepper motors 34 receives a signal from the controller. The stepper motor 34 displaces the wheel 5a accordingly. As the wheel 5a is displaced the ratio of rotational speed between the drive disc 6a and the wheel 5a is varied. Maintaining equal and opposite speeds at the mechanical inputs of the generator is important. Clearly, there are a variety of different methods are available to provide a variable ratio transmission between the turbine and the generator ensuring that equal quantities of torque are provided to the first field rotor and the second field rotor. Alternatively, the response of the first and second variable ratio transmissions is provided absent an external control.

By using equally sized turbines, the workload is shared by two rotors, reducing the size of the turbines and requirements of the transmission accordingly. Because of the lower gear ratios and lower torques, wear, drag and friction are substantially reduced. The reduced rotational speeds reduce the wear on components significantly, and thus reduce maintenance requirements. Because the rotor blades are smaller, they are relatively inexpensive in comparison with a single rotor having a swept area that is roughly equivalent to the two rotors blades 13a and 13b. Since the smaller blades are inherently more robust and less prone to damage induced by stress in use, the high material strength necessary for a larger rotor blade is mitigated along with problems associated with vibration and over-speeding. Thus, the weight of the turbines is reduced. Additionally, using two smaller rotor blades changes the wind shadow from a large, long, round cone shape to a smaller somewhat elliptical cone shape, and consequently they are believed to have less effect on other wind based power generators downstream.

Figure 3:
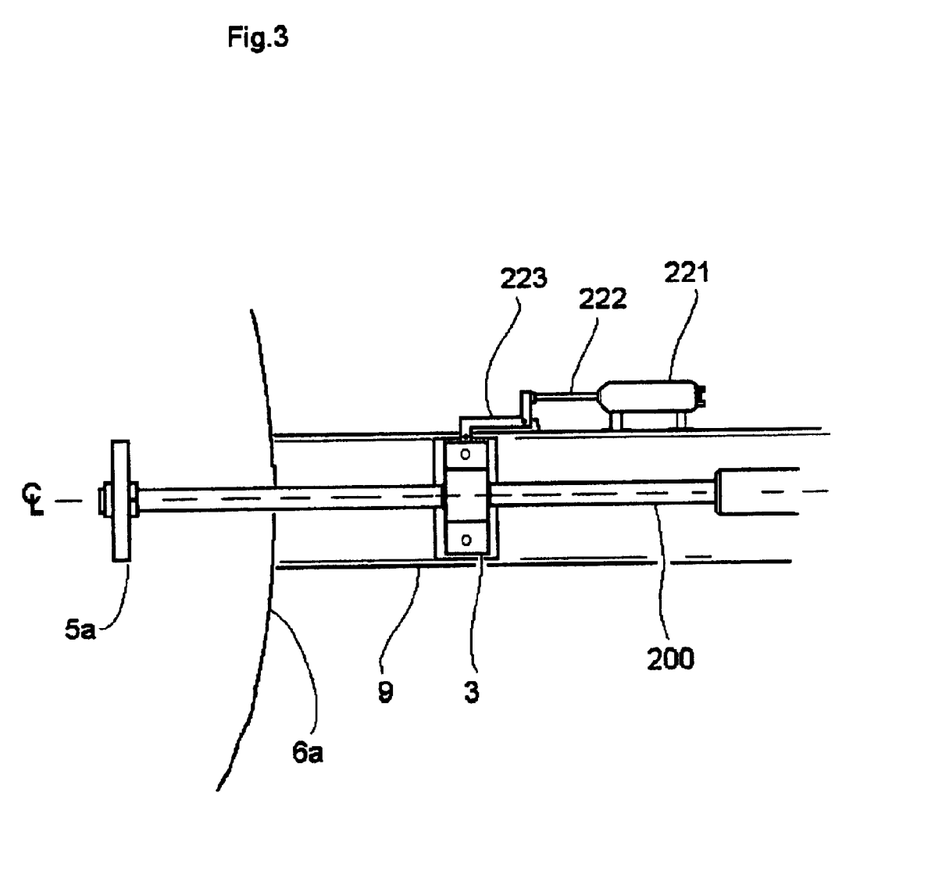
FIG. 3 is a detailed view of a variable ratio transmission system using a solenoid to change the position of the driven wheel on the drive disc.

Referring to FIG. 3 a simplified variable ratio transmission suitable for use with a wind generator according to the invention is shown. This diagram depicts side "a" of the wind generator however the wind generator has symmetric features and therefore an analogous mechanism is provided on side "b" of a wind generator consistent with the first embodiment of the invention. In operation, a double acting solenoid 221 provides a force on a rod 222 mechanically coupled to an arm 223. When the solenoid is activated, the arm 223 is displaced along the disc perpendicular to the centerline. The support bearing 3 is mounted on a flexible rubber base. The control arm 223 is connected to bearing 3 and pivots on slider base on which solenoid 221 is affixed. This assembly slides along the cross member 9 as the wheel 5a is displaced along the disc 6a. When solenoid 221 is activated, the shaft 200 is moved along the Y-axis, substantially perpendicular to line A. With the wheel 5a displaced parallel to line A and still in contact with disc 6a as the disc 6a rotates, it exerts a force on the wheel 5a to move along the axis or rotation of wheel 5a. This action varies the ratio of the rotational speed between the wheel 5a and the disc 6a. Clearly, in this case, the shaft 200 is sufficiently flexible to support the movement of the wheel 5a off the axis of line A while maintaining contact with disc 6a. Thus when an increased load is placed upon the generator a corresponding increase in the frictional forces between the wheel 5a and the disc 6a result in the shaft 200 flexing somewhat. This flexing action is used to move the wheel 5a off line A and thus causes the wheel to move away from the center of the disc 6a. With the wheel 5a positioned further from the center of the disc 6a more torque is provided to the shaft 200. Conversely, when the load on the generator is reduced, the shaft responds in an opposite manner resulting in less torque being provided to the generator.

Figure 4:
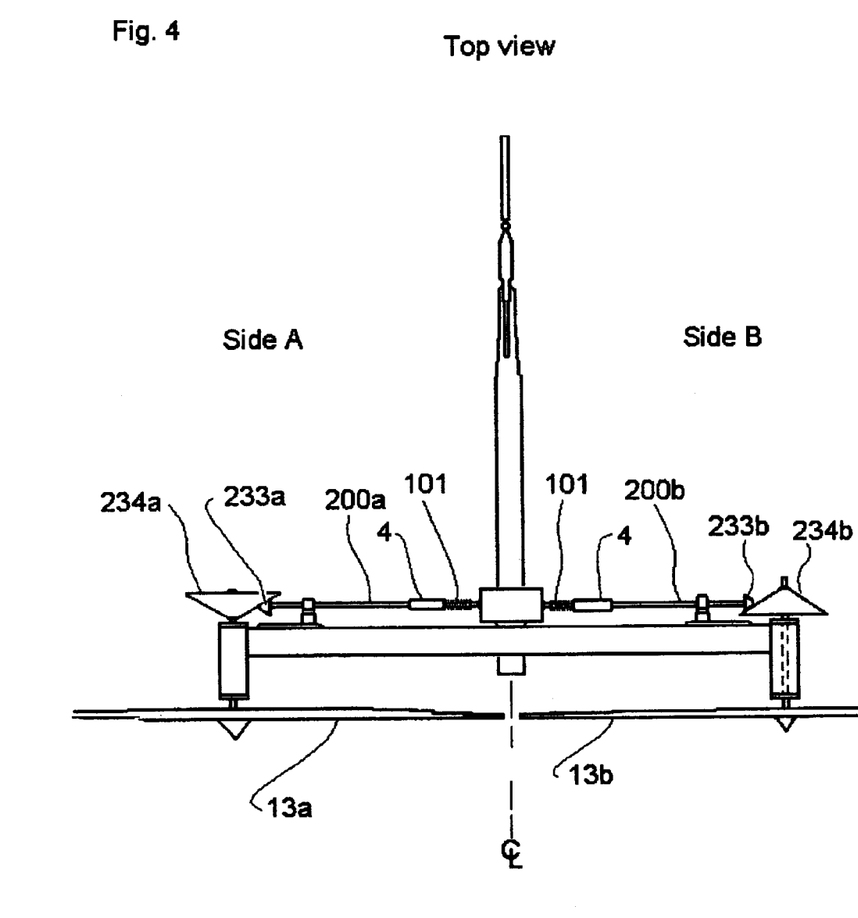
FIG. 4 is a top view of an embodiment of the invention with two wind turbines, each having a variable ratio mechanical linkage comprising a pair of frictionally engaged cones and each mechanical linkage is coupled to the generator.

In second embodiment shown in FIG. 4, a variable drive system featuring cone shaped elements is described. The drive shafts 200a and 200b have slip-joints 4 that allow the length of the shafts 200a and 200b to vary substantially. A return spring 101 is provided to bias the driven cones 233a and 233b against the drive cones 234a and 234b. In the starting position the cones are positioned to provide minimum torque to the generator thereby reducing the mechanical load on the rotors 13a and 13b. This allows the rotors 13a and 13b to reach operating speed rapidly. The alternator speed is regulated by the variable positions of the drive cones 234a and 234b. The drive cones 234a and 234b slide along the splined ends of the rotor blade shafts, changing positions with changes in rotor blade RPM. These changes are controlled by a mechanical governor (not shown). As the rotational speed of the drive cones 234a and 234b increase, the mechanical governor works against springs (not shown) to displace the drive cones 234a and 234b along their axes of rotation. The driven cones 233a and 233b being biased into the drive cones 234a and 234b continue to engage the drive cones but at a different position thereby changing the ration of rotational velocity between the drive cones 234a and 234b and their respective driven cones 233a and 233b.

Figure 5:
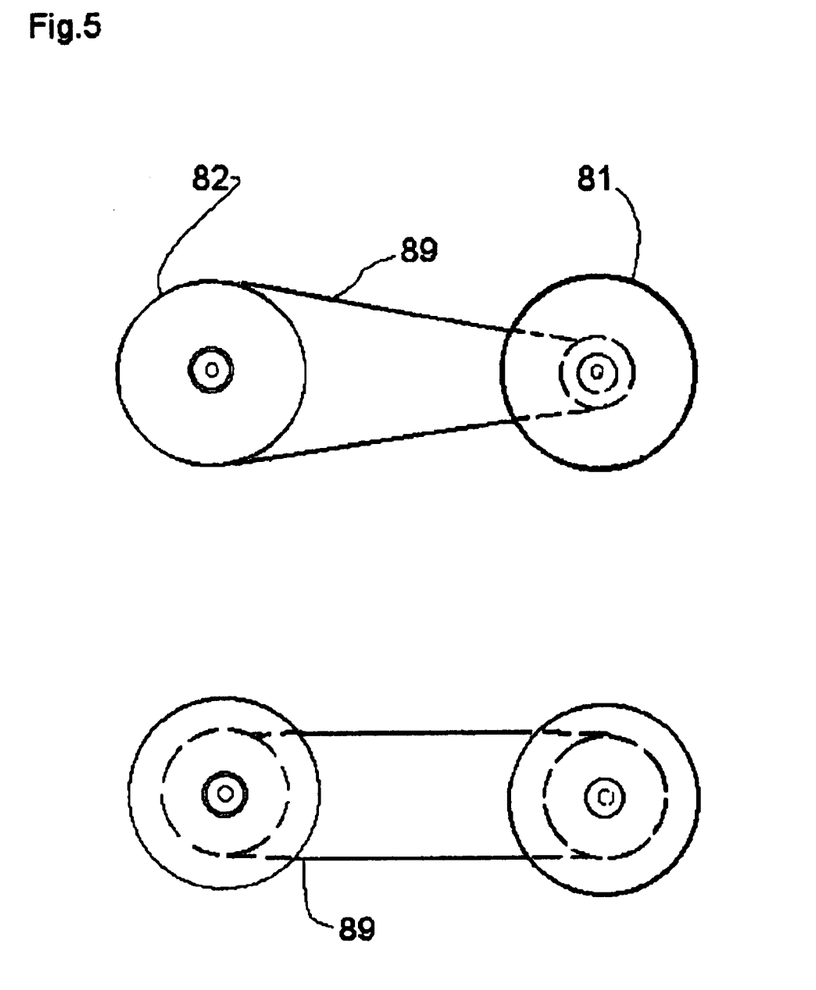
FIG. 5 is a diagram of a variable ratio transmission featuring pulleys.

Referring to FIG. 5, a variable ratio transmission that uses pulleys 81 and 82 is shown. A belt 89 mechanically links the pulleys 81 and 82. When it is desired to change the ratio of rotational speed between the pulleys, the separation of two discs that form pulley 81 is changed and consequently the effective diameter of the pulley changes. The other pulley 82 that is mechanically engaged the belt 89 also changes effective diameter to ensure that the belt 89 remains engaged with pulley 81. Clearly, other variations of the variable ratio transmission are easily incorporated with a wind generator according to the invention. A person of skill in the art of mechanical design will realize that any suitable type of variable ratio transmission is useable with a wind generator according to the invention.

Alternatively, another embodiment of the invention includes a generator featuring two rotating elements powered by turbines and 13a and 13b that provide energy to pumps. The pumps pressurize a working fluid. The working fluid is provided to two separate turbines. A first turbine provides mechanical energy to the first rotating element of the generator and the second turbine provides mechanical energy to the second rotating element of the generator. In this configuration, it is a simple matter to mechanically link any number of wind turbines to a single generator. This is highly advantageous due to the high cost of very large wind turbines in comparison to a large number of smaller wind turbines that extract an equivalent amount of energy from wind.

Figure 6:
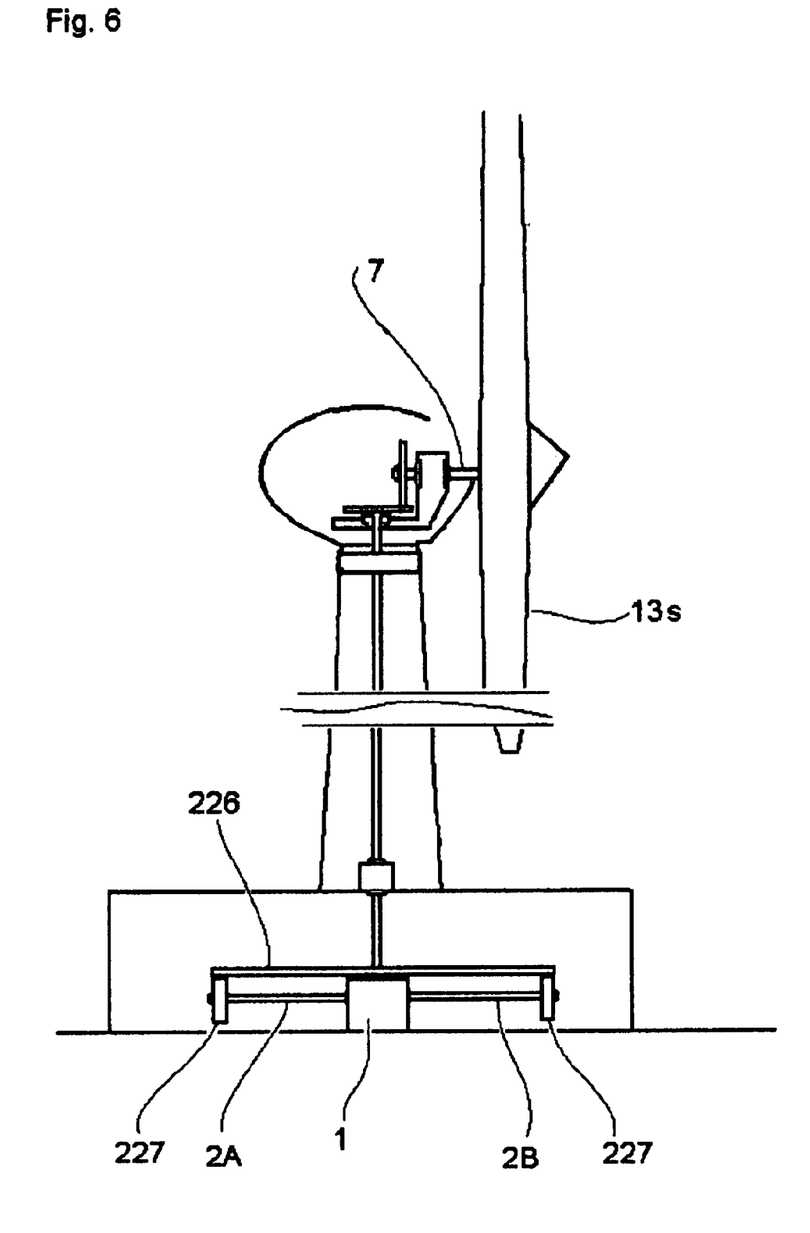
FIG. 6 is a diagram of an embodiment of the invention featuring a tower with a single wind turbine that is used to rotate a disc that provides mechanical energy to two rotational inputs of a generator; and, FIG. 7 is a diagram of a motor consistent with the generator according to the invention.

Referring to FIG. 6, a fifth embodiment of the invention with one wind turbine is shown. A single rotor 13s drives the wind rotor shaft 7. In use, mechanical energy is transferred from the shaft 7 to a single drive disc 226. Both of the driven wheels 227 ride on disc 226, each rotates in an opposite direction and provides energy to the input shafts 2A and 2B of the alternator 1. This embodiment has the disadvantage of using a large turbine 13s however it demonstrates a simple retrofit of an existing wind generating tower. Additionally, since each of the inputs of the generator are driven from the same mechanical element, in this case the disc 226, it is a simple matter to ensure that both sides of the generator receive equal amounts of input torque.

Additionally, an electrical motor of the same configuration as the generator of the various previously described embodiments of the invention is advantageous over current electric motors. A motor of this type is described as a "duo dynamic system". Such a motor will provide torque from two rotating output shafts. A first of these two shafts rotating in response to rotation of an electric rotor. An electric coil is rotationally coupled to the second output shaft. Providing current to the electric coil produces torque between the coil and the rotor. In another configuration of the motor, the rotor also receives current. Since the motor provides a difference in rotational velocity between two output shafts it is a simple matter to replace a conventional electric motor having a mechanical differential coupled thereto with a duo dynamic system motor and avoid any mechanical losses associated with a mechanical differential. Additionally, this configuration is believed to provide enhanced efficiency in comparison with a conventional electric motor.

Figure 7:
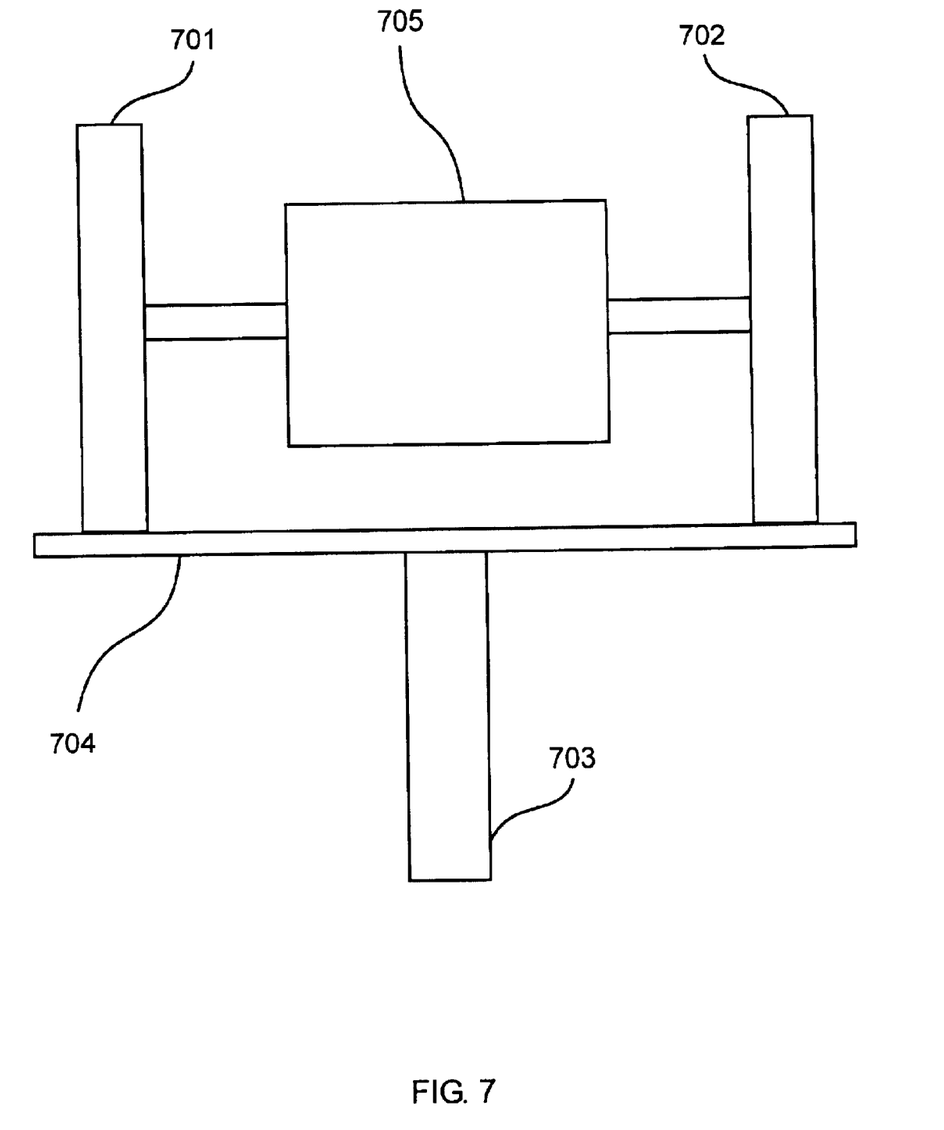

Referring to FIG. 7, an electric motor consistent with the previously described duo dynamic system motor is shown.

The motor housing 705 contains a coil and a rotor rotating in opposite directions. A first rotational output shaft is mechanically coupled to a first disc 701. A second rotational output shaft is mechanically coupled to a second disc 702. The discs 701 and 702 rotate in opposite directions and frictionally engage an output disc 704. The output disc provides mechanical output power provided by the first and second discs to the combined output shaft 703. Clearly, a variety of other configurations are available.

Clearly, numerous other embodiments may be envisaged without departing from the spirit or scope of the invention.

What is claimed is:

1. An electrical generator for converting energy from wind into electrical energy comprising:
    a first rotor for converting wind energy into rotational energy and disposed with a first axis of rotation;
    a second rotor for converting wind energy into rotational energy disposed with a second axis of rotation different from the first axis of rotation;
    a generator having;
    a first field rotor in mechanical communication with the first rotor for receiving rotational energy therefrom, and
    a second field rotor in mechanical communication with the second rotor for receiving rotational energy therefrom,
    a first transmission for receiving rotational energy from the first rotor and providing rotational energy to the first field rotor; and
    a second transmission receiving rotational energy from the second rotor and providing rotational energy to the second field rotor,
    wherein in use rotation of the first rotor in response to wind causes rotation of the first field rotor in a first direction and rotation of the second field rotor in a response to a wind with approximately same direction and energy causes rotation of the second field rotor in a second opposite directions;
    and wherein each of the first transmission and the second transmission is a variable ratio transmission.

2. An electrical generator according to claim 1, wherein, in use, the first and second variable ratio transmissions respond to ensure that equal quantities of torque are provided to the first field rotor and the second field rotor.

3. An electrical generator according to claim 2, wherein, in use, the response of the first and second variable ratio transmissions is provided absent an external control.

4. An electrical generator according to claim 1, wherein approximately no overlap exists between the areas covered by the first rotor and the second rotor in a direction normal to the direction of the wind.

5. An electrical generator according to claim 4, wherein the first rotor includes a turbine including turbine blades.

6. An electrical generator according to claim 1, wherein the first rotor includes a first propeller including first propeller blades and the second rotor includes a second propeller including second propeller blades.

* * * * *